United States Patent
Kamal et al.

(10) Patent No.: US 9,638,236 B2
(45) Date of Patent: May 2, 2017

(54) FASTENERS WITH COATED AND TEXTURED PIN MEMBERS

(71) Applicant: Alcoa Inc., Pittsburgh, PA (US)

(72) Inventors: Manish Kamal, Seal Beach, CA (US); Luke Haylock, Culver City, CA (US); Hasim Mulazimoglu, La Habra, CA (US); Andreas Liebscher, San Diego, CA (US); Gregory Rizza, Westminster, CA (US); Rodrigo Pinheiro, Riverside, CA (US)

(73) Assignee: ARCONIC INC., Pittsburgh, PA (US)

( * ) Notice: Subject to any disclaimer, the term of this patent is extended or adjusted under 35 U.S.C. 154(b) by 0 days.

(21) Appl. No.: 14/854,223

(22) Filed: Sep. 15, 2015

(65) Prior Publication Data

US 2016/0076575 A1   Mar. 17, 2016

Related U.S. Application Data

(60) Provisional application No. 62/051,602, filed on Sep. 17, 2014.

(51) Int. Cl.
*F16B 35/04* (2006.01)
*F16B 33/00* (2006.01)
(Continued)

(52) U.S. Cl.
CPC ............ *F16B 33/008* (2013.01); *B64D 45/02* (2013.01); *F16B 33/06* (2013.01); *F16B 35/06* (2013.01); *F16B 2019/045* (2013.01)

(58) Field of Classification Search
CPC .. F16B 15/0092; F16B 33/004; F16B 33/008; F16B 33/06; F16B 35/04; F16B 35/06; F16B 2019/045; B64D 45/02
(Continued)

(56) References Cited

U.S. PATENT DOCUMENTS 2,153,702 A * 4/1939 Tighe .................. F16B 35/00
411/378
2,396,661 A   3/1946 Keller et al.
(Continued)

FOREIGN PATENT DOCUMENTS

CN   105422578 A   3/2016
DE   202 10 801 U1   10/2002
(Continued)

OTHER PUBLICATIONS

International Search Report and Written Opinion issued in International Patent Application No. PCT/US2010/053342 entitled "Enhanced Conductivity Sleeved Fastener and Method for Making Same" (11 pages).
(Continued)

*Primary Examiner* — Roberta Delisle
(74) *Attorney, Agent, or Firm* — Greenberg Traurig, LLP

(57) ABSTRACT

A pin member for a fastener includes an elongated shank having a first end, a second end opposite the first end, a cylindrical shank portion having an outer surface, a head located at the first end of the elongated shank, the head including a bearing surface located on the bearing surface of the head, and a threaded portion located at the second end of the elongated shank. Either or both of the bearing surface of the head or the outer surface of the cylindrical shank portion is coated with a coating and/or is textured. The coating may be tungsten, molybdenum, copper, or a refractory ceramic. The textured surfaces may include a surface roughness greater than 0.5 micron.

26 Claims, 4 Drawing Sheets

(51) Int. Cl.
*B64D 45/02* (2006.01)
*F16B 33/06* (2006.01)
*F16B 35/06* (2006.01)
*F16B 19/04* (2006.01)

(58) Field of Classification Search
USPC .................................................. 411/424, 914
See application file for complete search history.

(56) References Cited

U.S. PATENT DOCUMENTS

| | | | |
|---|---|---|---|
| 2,501,567 A | 3/1950 | Huck | |
| 2,940,767 A | 6/1960 | Quayle | |
| 3,041,912 A | 7/1962 | Kreider et al. | |
| 3,215,024 A | 11/1965 | Brilmyer et al. | |
| 3,239,036 A | 3/1966 | Scott | |
| 3,271,058 A | 9/1966 | Anderson | |
| 3,304,109 A | 2/1967 | Schuster | |
| 3,464,306 A | 9/1969 | Reynolds et al. | |
| 3,535,911 A | 10/1970 | Armstrong et al. | |
| 3,634,129 A * | 1/1972 | Benz | C10M 3/00 411/548 |
| 3,792,933 A | 2/1974 | Stencel | |
| 3,820,297 A | 6/1974 | Hurd | |
| 3,835,615 A | 9/1974 | King, Jr. | |
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,048,898 A | 9/1977 | Salter | |
| 4,102,030 A | 7/1978 | King, Jr. | |
| 4,164,807 A | 8/1979 | King, Jr. | |
| 4,244,661 A | 1/1981 | Dervy | |
| 4,405,256 A | 9/1983 | King, Jr. | |
| 4,472,096 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covey | |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith | |
| 4,824,314 A * | 4/1989 | Stencel | F16B 33/006 411/378 |
| 4,850,771 A | 7/1989 | Hurd | |
| 4,863,330 A * | 9/1989 | Olez | B29C 70/081 411/424 |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| 5,419,948 A * | 5/1995 | Yoshino | C21D 9/0093 411/411 |
| D372,857 S | 8/1996 | Hirai | |
| 5,649,278 A * | 7/1997 | Dunmead | C01B 21/0602 419/13 |
| 5,788,441 A * | 8/1998 | Karabestos | F16B 33/02 411/366.3 |
| 6,149,363 A | 11/2000 | March | |
| 6,213,699 B1 | 4/2001 | Sadri et al. | |
| 6,499,926 B2 | 12/2002 | Keener | |
| 6,589,918 B2 | 7/2003 | Denpo et al. | |
| 6,659,699 B2 | 12/2003 | Stoewer et al. | |
| 6,665,922 B2 | 12/2003 | Schultz | |
| 7,038,920 B2 * | 5/2006 | Banyai | F16B 33/06 361/785 |
| 7,050,286 B2 | 5/2006 | Pridham et al. | |
| 7,160,630 B2 * | 1/2007 | Klos | C25D 5/48 411/378 |
| 7,236,343 B2 | 6/2007 | Heidlebaugh et al. | |
| 7,277,266 B1 | 10/2007 | Le et al. | |
| 7,307,825 B2 | 12/2007 | De La Fuente De Anna et al. | |
| 7,326,015 B2 | 2/2008 | Reynolds, Jr. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,755,876 B2 | 7/2010 | Morrill et al. | |
| 7,842,403 B2 * | 11/2010 | Meyer, Jr. | B05D 5/08 411/548 |
| 7,869,181 B2 | 1/2011 | Le | |
| 7,898,785 B2 | 3/2011 | Winter et al. | |
| 7,969,706 B2 | 6/2011 | Heeter et al. | |
| 8,312,606 B2 | 11/2012 | Reid et al. | |
| 8,573,910 B2 | 11/2013 | March et al. | |
| 8,636,455 B2 | 1/2014 | Wehrmeister et al. | |
| 8,647,035 B2 | 2/2014 | Bakken et al. | |
| 9,123,998 B1 | 9/2015 | LoRe | |
| 2002/0119028 A1 | 8/2002 | Brown et al. | |
| 2004/0091331 A1 | 5/2004 | Schultz | |
| 2005/0058525 A1 * | 3/2005 | Bakos | F16B 35/048 411/424 |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2007/0258182 A1 | 11/2007 | Morrill et al. | |
| 2008/0075555 A1 | 3/2008 | March | |
| 2008/0240925 A1 | 10/2008 | Kita et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sánchez-Brunete Alvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2010/0278616 A1 | 11/2010 | March | |
| 2011/0056718 A1 | 3/2011 | Gattus et al. | |
| 2013/0004261 A1 * | 1/2013 | Pattinson | F16B 33/06 411/366.1 |
| 2014/0056664 A1 | 2/2014 | March | |
| 2014/0230228 A1 | 8/2014 | Whitlock et al. | |
| 2016/0076575 A1 | 3/2016 | Kamal et al. | |

FOREIGN PATENT DOCUMENTS

| | | |
|---|---|---|
| DE | 10 2010 009001 A1 | 9/2011 |
| DE | 102013000308 A1 | 7/2014 |
| EP | 0217312 A2 | 4/1987 |
| EP | 0248122 A2 | 12/1987 |
| EP | 0468563 A1 | 1/1992 |
| EP | 2 471 712 A2 | 7/2012 |
| EP | 2 615 314 A1 | 7/2013 |
| EP | 2805889 A1 | 11/2014 |
| FR | 2 165 404 A5 | 8/1973 |
| GB | 2212580 A | 7/1989 |
| JP | 7151111 A | 12/1996 |
| WO | 8705976 A1 | 10/1987 |
| WO | 2009/063060 A1 | 5/2009 |

OTHER PUBLICATIONS

International Search Report and Written Opinion issued in International Patent Application No. PCT/US07/78775, dated Oct. 22, 2008 (7 pages).

International Search Report and Written Opinion issued in International Patent Application No. PCT/US2010/029758, dated Sep. 7, 2010 (11 pages).

Notice of Opposition of European Patent Application No. 07116776, including English-language translation, filed Jan. 6, 2012.

ASTM International, "Standard Guide for Measuring and Reporting Friction Coefficients", Nov. 2008, pp. 1-12.

(56) References Cited

OTHER PUBLICATIONS

Huck International, Inc., Huck Aerospace Fasteners for Composite Structure, copyright 1992.
"Guide d'emploi des traitements de surfaces appliques aux problemes de frottement", including its English-language translation, copyright Technique and Documentation, 2000.
Huck Manufacturing Company, "Lightweight (GP) Interference Fit Fastener for Composite Materials", Apr. 1984.
Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.
Rockwell International, Space Systems Division, "Preload Measurement in Sleeve Bolts Using an Ultrasonic Technique", Feb. 1996, by Ajay Koshti.
Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.
Wrocklow University of Technology, Department of Mechanical Engineering, "The Statistical Correlation of the Coefficient of Friction and Wear Rate of PTFE Composites with Steel Counterface Roughness and Hardness", Wojciech Wielaba, 2002.
International Search Report and Written Opinion dated Dec. 14, 2015, issued by the European Patent Office in International (PCT) Application No. PCT/US2015/050105 (11 pages).
International Search Report and Written Opinion dated Dec. 17, 2015, issued by the European Patent Office in International (PCT) Application No. PCT/US2015/050091 (12 pages).
International Search Report and Written Opinion dated Oct. 19, 2016, issued by the European Patent Office in International Patent Application No. PCT/US2016/037610 filed Jun. 15, 2016 (12 pages).

\* cited by examiner

FASTENERS WITH COATED AND TEXTURED PIN MEMBERS

CROSS-REFERENCE TO RELATED APPLICATION

This application is a Section 111(a) application relating to and claiming the benefit of commonly-owned, U.S. Provisional Patent Application Serial No. 62/051,602, entitled "FASTENERS WITH COATED AND TEXTURED PIN MEMBERS," filed Sep. 17, 2014, the entirety of which is incorporated herein by reference.

FIELD OF THE INVENTION

The present invention relates to fasteners and, more particularly, to fasteners having coated and/or textured pin members.

BACKGROUND OF THE INVENTION

Continuous fiber reinforced composites are extensively used in both primary and secondary aircraft components for a variety of applications where light weight, higher strength and corrosion resistance are primary concerns. Composites are typically composed of fine carbon fibers that are oriented at certain directions and surrounded in a supportive polymer matrix. Since the plies of the composite material are arranged at a variety of angles, and depending upon the direction of major loading, the resultant structure is typically a stacked laminated structure, which is highly anisotropic and heterogeneous. A significant portion of the composite structure is fabricated as near net-shape, but is drilled in order to facilitate joining of components using mechanical fasteners. Drilling fastener holes in composite does not compare to the uniformity of aluminum or steel since individual carbon fibers fracture at irregular angles and form microscopic voids between the fastener and the hole. As the cutting tool wears down, there is an increase of surface chipping and an increase in the amount of uncut fibers or resin and delamination. The composite microstructure containing such defects is referred to as "machining-induced micro texture."

In addition to their machining challenges, composite structures in aircrafts are more susceptible to lightning damage compared to metallic structures. Metallic materials, such as aluminum, are very conductive and are able to dissipate the high currents resulting from a lightning strike. Carbon fibers are 100 times more resistive than aluminum to the flow of current. Similarly epoxy, which is often used as a matrix in conjunction with carbon fibers, is 1 million times more resistive than aluminum. The composite structural sections of an aircraft often behave like anisotropic electrical conductors. Consequently, lightning protection of a composite structure is more complex, due to the intrinsic high resistance of carbon fibers and epoxy, the multi-layer construction, and the anisotropic nature of the structure. Some estimates indicate that, on average, each commercial aircraft in service is struck by lightning at least once per year. Aircraft flying in and around thunderstorms are often subjected to direct lightning strikes as well as to nearby lightning strikes, which may produce corona and streamer formations on the aircraft. In such cases, the lightning discharge typically originates at the aircraft and extends outward from the aircraft. While the discharge is occurring, the point of attachment moves from the nose of the aircraft and into the various panels that compromise the skin of the aircraft. The discharge usually leaves the aircraft structure through the empennage.

The protection of aircraft fuel systems against fuel vapor ignition due to lightning is even more critical. Since commercial aircraft contain relatively large amounts of fuel and also include very sensitive electronic equipment, they are required to comply with a specific set of requirements related to the lightning strike protection in order to be certified for operation. It is a well-known fact that fasteners are often the primary pathways for the conduction of the lightning currents from skin of the aircraft to supporting structures such as spars or ribs, and poor electrical contact between the fastener body and the parts of the structure can lead to detrimental fastener arcing or sparking.

To avoid the potential for ignition at the fastener/composite structure interface, some aircraft use fasteners which are in intimate contact with the fastener hole. Intimate contact between bare metallic fasteners and the hole in the composite structure has been known to be the best condition for electrical current dissipation. One approach to achieve fastener-to-composite hole intimacy is to use a sleeved fastener. This approach involves first inserting a close fitting sleeve in the hole. An interference-fit pin is then pulled into the sleeve. This expands the sleeve to bring it in contact with the wall of the hole in the composite structure. Although the sleeve substantially reduces the gap between the fastener and composite structure, it cannot eliminate the small gaps created due to the presence of drilling induced texture across the composite inner-hole surface. This machining induced texture also entraps excess sealant, an insulating material, inhibiting the intimate contact between the sleeve and the hole. This situation becomes even worse as the cutting tool wears, resulting in more and larger machining induced defects.

In order to avoid this condition, the current must dissipate through the carbon fibers perpendicular to the fastener hole. If the fastener is not in intimate contact with the inside of the hole, the instantaneous heat energy ionizes the air/metal vapor in the gap and creates arc plasma that blows out in the form of a spark. The intrinsic high conductivity of metallic fasteners and the large number of fasteners used in aircraft construction combine to create a condition of a high probability of lightning attachment to fasteners.

SUMMARY OF THE INVENTION

In an embodiment, a pin member, comprising an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank, wherein the bearing surface of the head is coated with a coating. In an embodiment, the coating is selected from the group consisting of tungsten, molybdenum, tantalum, niobium, and a refractory ceramic. In another embodiment, the coating is selected from the group consisting of copper and silver. In an embodiment, the bearing surface of the head is textured. In an embodiment, the textured bearing surface of the head includes a surface roughness greater than 0.5 micron. In an embodiment, the outer surface of the cylindrical shank portion is coated with the coating. In an embodiment, the outer surface of the cylindrical shank portion is textured. In an embodiment, the textured outer surface of the cylindrical shank portion includes a surface roughness greater than 0.5 micron.

In another embodiment, a pin member, comprising an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank, wherein the bearing surface of the head is textured. In an embodiment, the textured bearing surface of the head includes a surface roughness greater than 0.5 micron. In an embodiment, the cylindrical shank portion is coated with a coating. In an embodiment, the coating is selected from the group consisting of tungsten, molybdenum, tantalum, niobium, and a refractory ceramic. In another embodiment, the coating is selected from the group consisting of copper and silver. In an embodiment, the cylindrical shank portion is textured. In an embodiment, the textured outer surface of the cylindrical shank portion includes a surface roughness greater than 0.5 micron.

In an embodiment, a pin member, comprising an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank, wherein the outer surface of the cylindrical shank portion is coated with a coating. In an embodiment, the coating is selected from the group consisting of tungsten, molybdenum, tantalum, niobium, and a refractory ceramic. In another embodiment, the coating is selected from the group consisting of copper and silver. In an embodiment, the outer surface of the cylindrical shank portion is textured. In an embodiment, the textured outer surface of the cylindrical shank portion includes a surface roughness greater than 0.5 micron.

In another embodiment, a pin member, comprising an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank, wherein the outer surface of the cylindrical shank portion is textured. In an embodiment, the textured outer surface of the cylindrical shank portion includes a surface roughness greater than 0.5 micron.

In an embodiment, a fastener includes a pin member having a surface whose characteristics are adapted for lightning strike protection. In an embodiment, the fastener includes a locking member. In an embodiment, the locking member is a nut. In another embodiment, the locking member is a collar. In an embodiment, the pin member is a bolt.

DETAILED DESCRIPTION OF THE DRAWINGS

Figure 1:
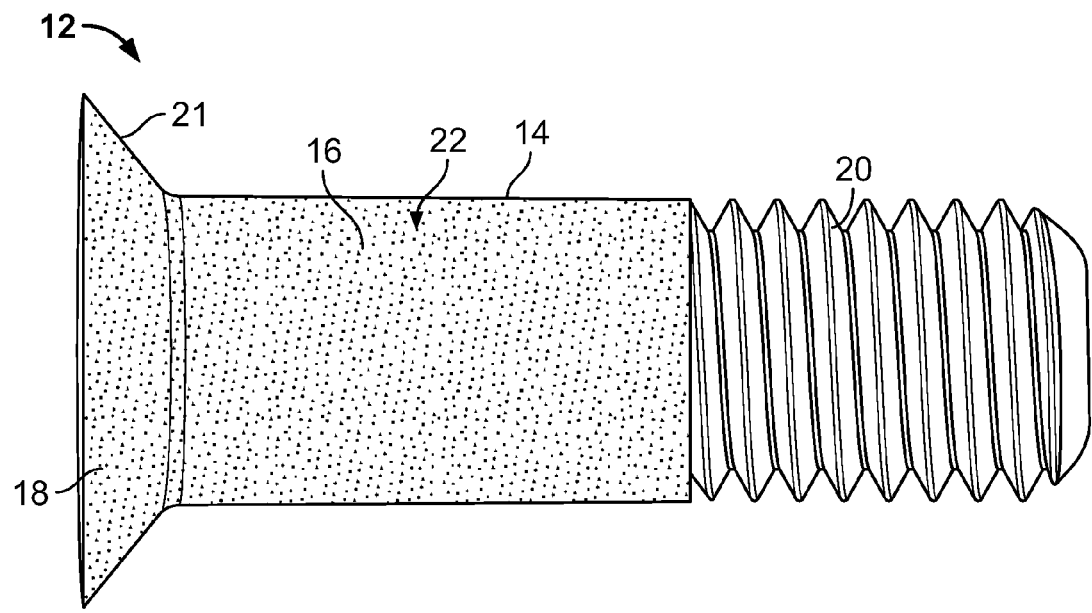
FIG. 1 is a side elevational view of an embodiment of a pin member having selected surfaces coated with a material.

Referring to FIG. 1, in an embodiment, a pin member 12 includes an elongated shank 14 having a cylindrical shank portion 16, a head 18 at one end of the cylindrical shank portion 16 and a threaded portion 20 at an opposite end of the cylindrical shank portion 16. In an embodiment, the head 18 is a countersunk head. In an embodiment, the outer surfaces of the head 18, including an underside surface (e.g., bearing surface) 21 of the head 18, and the cylindrical shank portion 16 are coated with coating 22. In an embodiment, the coating 22 is tungsten. In another embodiment, the coating 22 is molybdenum. In another embodiment, the coating 22 is a refractory metal, such as tantalum or niobium. In another embodiment, the coating 22 is a refractory ceramic, such as alumina ($Al_2O_3$), silica ($SO_2$) or other metal oxides. In another embodiment, only the outer surfaces of the head 18 are coated with the coating 22. In another embodiment, only the outer surface of the cylindrical shank portion 16 is coated with the coating 22. In an embodiment, the coating 22 lowers electrical contact resistance and reduces probability of arc initiation/damage. In an embodiment, the coating 22 includes a high electrical conductivity (higher than 20% IACS) and be galvanically compatible to a structure (e.g., anodic index less than 1.0 V) for corrosion resistance. In an embodiment, the structure includes a composite structure. In another embodiment, the structure includes a metal structure. In another embodiment, the structure includes a fiber metal laminate structure.

In an embodiment, the coating 22 is a thin film coating having a thickness in a range of about one (1) nanometer to about two-hundred (200) microns. In an embodiment, the coating 22 is applied by physical vapor deposition. In another embodiment, the coating 22 is applied by chemical vapor deposition. In another embodiment, the coating 22 is applied by a selective additive process. In another embodiment, the coating 22 is applied by electroplating. In another embodiment, the coating 22 is applied by a spraying process. In another embodiment, the coating 22 is applied by cold spraying. In another embodiment, the coating 22 is applied by thermal spraying. In another embodiment, the coating 22 is applied by plasma coating. In another embodiment, the coating 22 is applied by a sputter deposition process.

In another embodiment, the outer surfaces of the head 18 and the cylindrical shank portion 16 are textured. In an embodiment, the outer surfaces of the head 18 and the cylindrical shank portion 16 of the pin member 12 are textured to conform to the machine-induced micro texture inherent in fastener holes drilled in composite structures, and to provide mechanical interlocking between the pin member 12 and the composite structure. In an embodiment, the textured pin member 12 excavates excess entrapped sealant during installation of the fastener while bringing the fastener in intimate contact with the structure, and, thus, lowering the electrical contact resistance at the interface. The term "intimate contact" as used herein means that the textured outer surface of the pin member 12 is deformed into all or substantially all of voids between the pin member and the composite structure. In another embodiment, only the outer surfaces of the head 18 are textured. In another embodiment, only the outer surface of the cylindrical shank portion 16 is textured.

In an embodiment, the textured surfaces of the pin member 12 are created by surface reshaping processes, such as media blasting. In an embodiment, the textured surfaces of the pin member 12 are grit blasted. In an embodiment, the grit blasting utilizes fine grit glass bead media (100-170 mesh). In an embodiment, the grit blasting is performed until there is full coverage of the outer surfaces of the pin member 12 to be textured. In an embodiment, the grit blasting is performed for at least one minute. In another embodiment, the grit blasting is performed for about one minute. In an embodiment, the grit blasting step is performed twice. In another embodiment, the textured surfaces of the pin member 12 are created by removal processes, such as selective electro-etching, laser etching, abrasive blasting, and mechanical polishing. In another embodiment, the textured surfaces of the pin member 12 are created by chemical etching. In an embodiment, the chemical etching utilizes 50/50 hydrochloric acid (HCl). In an embodiment, the chemical etching is performed for about 30 minutes. In an embodiment, the pin member 12 is rinsed with distilled water for about 15-20 seconds, and dried with forced, room-temperature air for approximately 1 to 2 minutes.

In another embodiment, the surfaces of the head 18 and the cylindrical shank portion 16 of the pin member 12 are coated and textured by a combination of a coating process and a texturing process as described above. In an embodiment, a combination of the coating and texturing processes can be used to develop functional characteristics of the pin member 12, based on a specific loading pattern thereof. For example, in an embodiment, where the preload is high, the texturing/coating is performed to lower contact resistance. At locations which carry no preload and are not in intimate contact with the composite layer, mitigation of plasma generation and arc formation/damage is desired.

Figure 2:
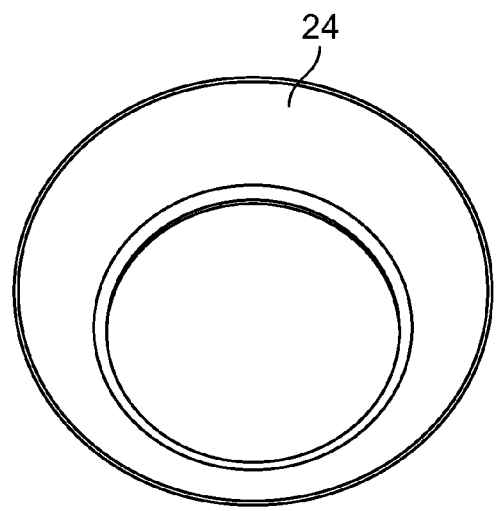
FIG. 2 is a bottom perspective view of an embodiment of a washer.
Figure 3:
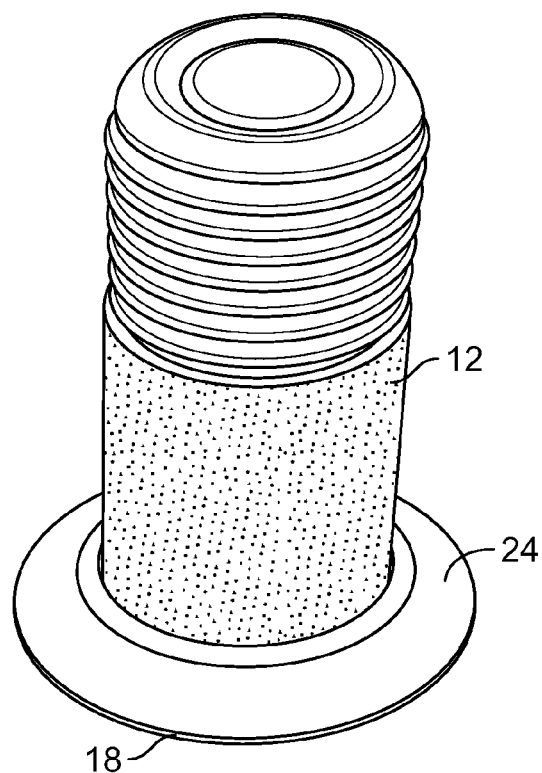
FIG. 3 is a bottom perspective view of the pin member and the washer shown in FIGS. 1 and 2, respectively, assembled together.

In an embodiment, the pin member 12 is part of a fastener that is adapted to secure a plurality of work pieces of to one another, and is adapted to be installed within aligned holes in such work pieces. In an embodiment, the work pieces are made of a composite material. In another embodiment, the work pieces are made of metal. In another embodiment, the work pieces are made from a fiber metal laminate. In an embodiment, the fastener includes a locking member (not shown in the Figures). In an embodiment, the locking member is a nut. In another embodiment, the locking member is a collar. In an embodiment, a fastener 10 includes the pin member 12 and a washer 24 installed on the bearing surface 21 of the head 18 of the pin member 12, as shown in FIGS. 2 and 3, and to be discussed in further detail below.

During a lightning strike on an aircraft, the lightning typically attaches to the head 18 of the pin member 12 first. In an embodiment, the coated and/or textured pin member 12 improves contact resistance. In this regard, all solid surfaces are rough on a micro-scale and contact between two engineering bodies occurs at discrete spots produced by the mechanical contact of asperities on the two surfaces. For all solid materials, the true area of contact is a small fraction of the apparent contact area. Electrical current lines get increasingly distorted as the contact spot is approached and flow lines bundle together to pass through "a-spots". An electrical junction consists of a number of contact "a-spots" through which electrical current passes from one connector component to the other and is often characterized by electrical contact resistance of the interface.

When a fastener is installed in a composite structure using a clearance fit, the primary load bearing surface of the pin member 12 as installed is the bearing surface 21 of the head 18. This is an electrical contact through which it is desired to pass a high frequency, high voltage current and is a significant first line of defense to the lightning strike. If the current has a path to flow easily, no arcing and resultant damage would occur. The pin or bolt to composite interface can prove to be an inefficient electrical contact due to dissimilar materials, presence of electrically insulating films like aircraft sealant and/or hard oxide layers on the surface and irregular cut pattern of the composite. To allow current to flow easily through the pin/bolt to composite interface, the interface contact resistance is desired to be low.

Contact resistance is highly dependent on the applied load on both the surfaces that brings them in contact and electrical and mechanical properties of the material surface in contact. A soft material at the interface with high electrical conductivity lowers the contact resistance, as do higher loads. The load in a pin member joint is provided by the preload and is primarily geometry/design dependent. As described above, the material coating 22 or texturing on the bearing surface 21 of the head 18 is used to both provide a low resistivity material at the contact interface and a soft conforming layer for better contact with the structure. Soft materials with high electrical conductivity, such as copper, silver or other metals/materials can be used to lower contact resistance (see, e.g., the copper washer 24 shown in FIGS. 2 and 3).

The surfaces of the pin member 12, as described above, can also be textured to enable better intimacy with the surrounding composite layer. As the textured pin member 12 is installed, the textured pin member deforms into the small voids that are created during drilling of the composite layer. As the textured surfaces deform into the voids, they displace the entrapped sealant during fastener installation. The insertion of the pin member 12 causes the excess sealant to be extruded outside the pin member 12/composite interface. Thus, the textured pin member 12 excavates excess entrapped sealant during installation of the fastener while bringing the pin member 12 in intimate contact with the composite structure. The finish texture of the pin member's 12 surfaces is adjusted to provide a surface micro-roughness (Sa) value in order to increase the level of conformity and mechanical interlocking. In an embodiment, the surface roughness (Sa) is greater than 0.5 micron.

As described above, FIG. 1 shows an embodiment of a tungsten coated pin member 12. In an embodiment, plasma coating was used to deposit tungsten on the pin member 12 and achieve a surface roughness (Sa) equal or greater than 7 micron. FIG. 2 shows the washer 24 and FIG. 3 shows the pin member 12 with the washer 24 installed on it to promote intimacy with the composite layer on the bearing surface 21 of the head 18. In an embodiment, the washer 24 is frusto-conical in shape, and is sized and shaped to fit on the bearing surface 21 of the head 18. In another embodiment, this can also be achieved by copper coating the bearing surface 21 of the head 18. In another embodiment, the washer 24 is a captive washer. In another embodiment, the washer 24 is coated with a coating. In an embodiment, the coating of the washer 24 includes the coating 22.

Figure 4:
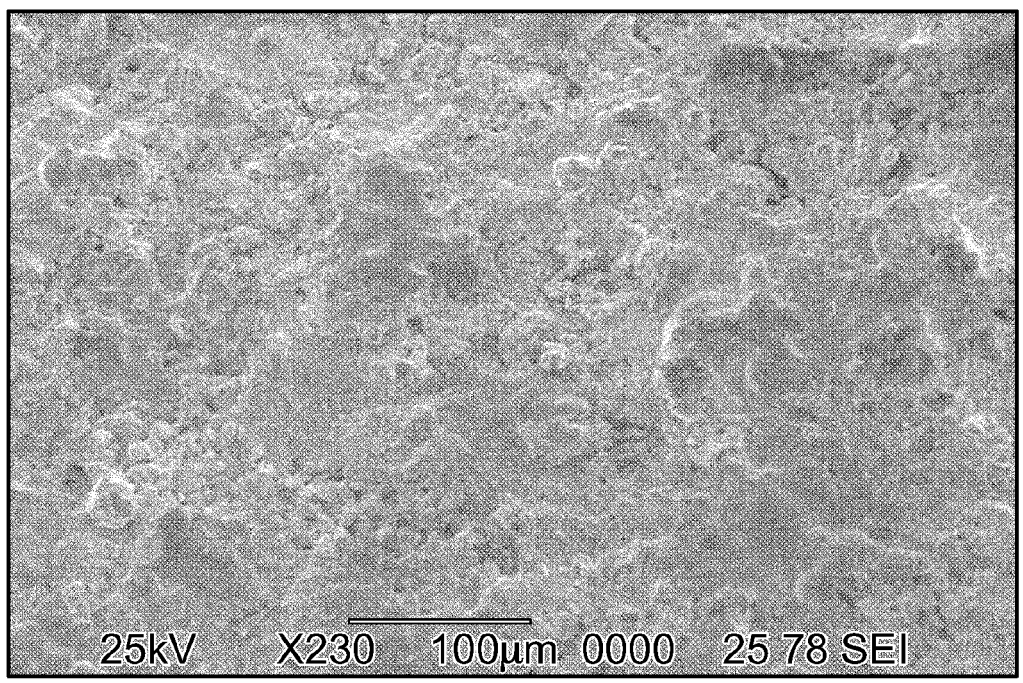
FIG. 4 is a photograph of an embodiment of an outer surface of the coated pin member shown in FIG. 1.
Figure 5:
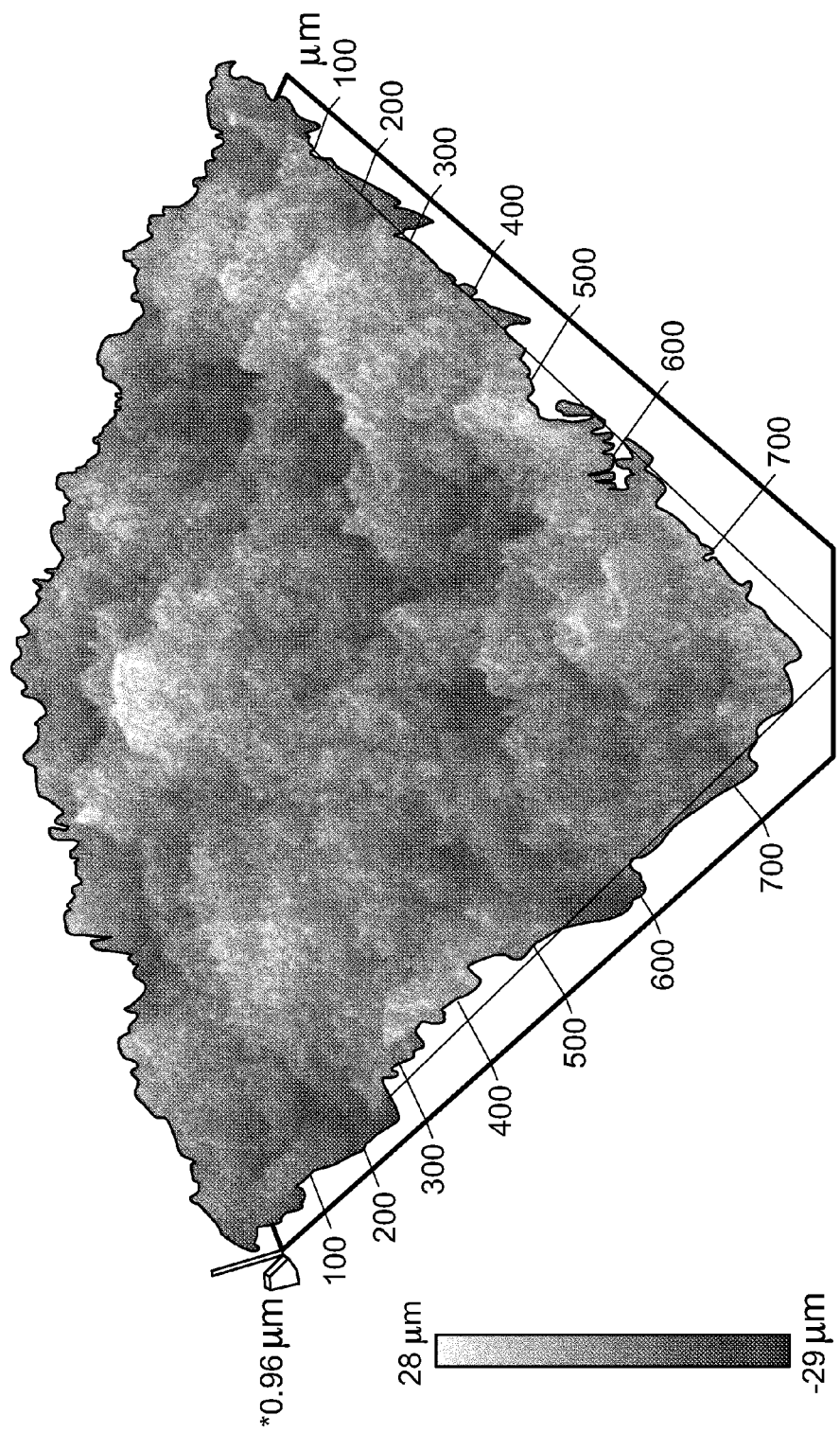
FIG. 5 is a photograph of the topography of an outer surface of an embodiment of the coated pin member shown in FIG. 1.
Figure 6:
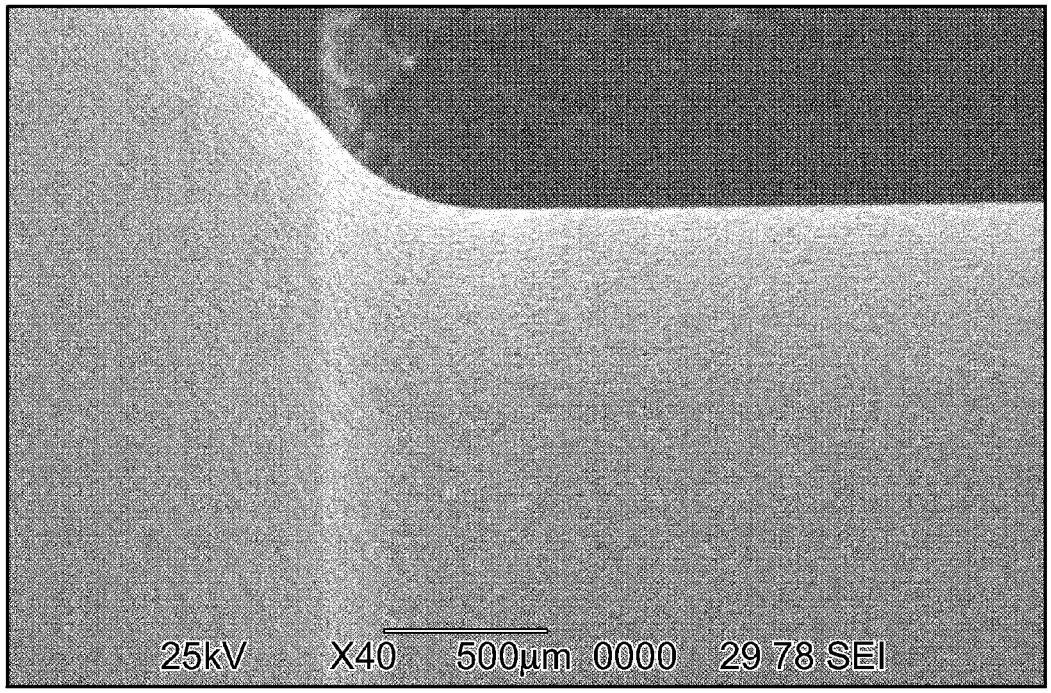
FIGS. 6 and 7 are photographs of an embodiment of a pin member having a textured surface.
Figure 7:
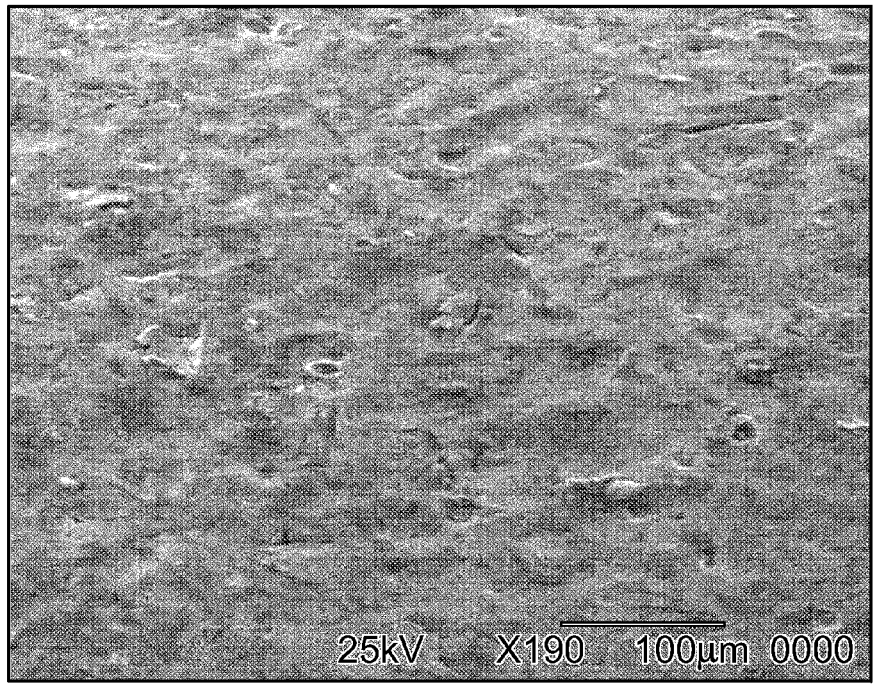

FIG. 4 shows a photograph of the texture variation of the coated pin member 12, while FIG. 5 shows the surface topography of the coated pin member 12. In an embodiment, the coated surfaces of the pin member 12 have an average surface roughness (Sa) of 7.5 micron. FIGS. 6 and 7 are photographs of the textured pin member 12 at 40× and 190× magnification, respectively. As can be seen in FIGS. 6 and 7, the textured pin member 12 exhibits a substantially rough finish. In an embodiment, the textured pin member 12 provides improved electrical contact along the textured surfaces of the pin member 12, which minimizes the dielectric effect caused by the sealant, promotes easier transfer of electric current, reduces the voltage potential across the pin member 12/composite interface, and thus enables transfer of electric current without any breakdown effects like arcing.

In an embodiment, in a clearance fit hole, there is no preload between the shank 14 of the pin member 12 and the composite layer, and thus electrical contact is relatively poor. Thus, it would be difficult to ensure significant current flow between the pin member 12 and the composite layer. In case sufficient currents are not conducted by the bearing surface 21 of the head 18, there would be a possibility of arcing at the gap between the shank 14 and the adjacent composite layers. Arc formation under such conditions typically initiates in the metal vapor itself. The presence of a high temperature melting material with high conductivity will ensure that sufficient metal vapor is not present to initiate arcing. Even if arcing is initiated, the volume of plasma will be low. Higher conductivity will also ensure that current is more easily passed between the shank 14 and composite layer if contact is available. As described above, in certain embodiments, materials like tungsten, molybdenum, or refractory metals/ceramics can be used as the coating 22 on the shank 14 of the pin member 12 to ensure reduction in arc damage. Since lightning strikes generate high frequency currents, current would typically flow close to the fastener surface due to "skin effect". The coating on the pin member 12 also helps in this respect that a higher temperature melting point and high conductivity material would carry most of the current lowering the likelihood of fastener melting or plasma generation.

Thus, the coated/textured pin member 12:

Improves electrical contact between composite and fastener surface;

Minimizes fastener arcing during lightning strikes;

Provides gap filling and mechanical interlocking capabilities;

Reduces likelihood of plasma formation during arcing around the fastener shank;

In case arcing occurs in the fastener, reduces the volume of plasma generated to make it easier to be contained.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the bearing surface of the head is textured and coated with a coating, and
wherein the bearing surface of the head includes a surface roughness greater than 0.5 micron.

2. The pin member of claim 1, wherein the coating is selected from the group consisting of tungsten, molybdenum, tantalum, niobium, and a refractory ceramic.

3. The pin member of claim 1, wherein the coating is selected from the group consisting of copper and silver.

4. A pin member, comprising:
an elongated shank having a first end, a second end opposite the first end, a cylindrical shank portion having an outer surface, a head located at the first end of the elongated shank. the head including a bearing surface located on the underside of the head, and a threaded portion located at the second end of the elongated shank,
wherein the bearing surface of the head is coated with a coating, wherein the outer surface of the cylindrical shank portion is textured, and wherein the textured outer surface of the cylindrical shank portion includes a surface roughness greater than 0.5 micron.

5. The pin member of claim 4, wherein the coating is selected from the group consisting of tungsten, molybdenum, tantalum, niobium, and a refractory ceramic.

6. The pin member of claim 4, wherein the coating is selected from the group consisting of copper and silver.

7. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the bearing surface of the head is coated with a coating, wherein the outer surface of the cylindrical shank onion is textured and coated with the coating, and wherein the textured outer surface of the cylindrical shank portion includes a surface roughness greater than 0.5 micron.

8. The pin member of claim 7, wherein the bearing surface of the head is textured.

9. The pin member of claim 7, wherein the coating is selected from the group consisting of tungsten, molybdenum, tantalum, niobium, and a refractory ceramic.

10. The pin member of claim 7, wherein the coating is selected from the group consisting of copper and silver.

11. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the bearing surface of the head is textured and coated with a coating, wherein the outer surface of the cylindrical shank portion is coated with the coating, and wherein the textured bearing surface of the head includes a surface roughness greater than 0.5 micron.

12. The pin member of claim 11, wherein the outer surface of the cylindrical shank portion is textured.

13. The pin member of claim 11, wherein the coating is selected from the group consisting of tungsten, molybdenum, tantalum, niobium, and a refractory ceramic.

14. The pin member of claim 11, wherein the coating is selected from the group consisting of copper and silver.

15. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the bearing surface of the head is textured, and wherein the textured bearing surface of the head includes a surface roughness greater than 0.5 micron.

16. The pin member of claim 15, wherein the cylindrical shank portion is coated with a coating.

17. The pin member of claim 16, wherein the coating is selected from the group consisting of tungsten, molybdenum, tantalum, niobium, and a refractory ceramic.

18. The pin member of claim 16, wherein the coating is selected from the group consisting of copper and silver.

19. The pin member of claim 16, wherein the cylindrical shank portion is textured.

20. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the bearing surface of the head is textured,
wherein the outer surface of the cylindrical shank portion is textured and coated with a coating,
wherein the textured bearing surface of the head includes a surface roughness greater than 0.5 micron, and
wherein the textured outer surface of the cylindrical shank portion includes a surface roughness greater than 0.5 micron.

21. The pin member of claim 20, wherein the coating is selected from the group consisting of tungsten, molybdenum, tantalum, niobium, and a refractory ceramic.

22. The pin member of claim 20, wherein the coating is selected from the group consisting of copper and silver.

23. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the outer surface of the cylindrical shank portion is textured and coated with a coating, and
wherein the textured outer surface of the cylindrical shank portion includes a surface roughness greater than 0.5 micron.

24. The pin member of claim 23, wherein the coating is selected from the group consisting of tungsten, molybdenum, tantalum, niobium, and a refractory ceramic.

25. The pin member of claim 23, wherein the coating is selected from the group consisting of copper and silver.

26. A pin member, comprising:
an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank,
wherein the outer surface of the cylindrical shank portion is textured, and
wherein the textured outer surface of the cylindrical shank portion includes a surface roughness greater than 0.5 micron.

* * * * *